(12) United States Patent
Lo et al.

(10) Patent No.: US 10,369,540 B2
(45) Date of Patent: Aug. 6, 2019

(54) CELL STRUCTURES FOR USE IN HEAT EXCHANGERS, AND METHODS OF PRODUCING THE SAME

(71) Applicant: HONEYWELL INTERNATIONAL INC., Morris Plains, NJ (US)

(72) Inventors: Charles Lo, Peoria, AZ (US); Bijan F. Hagh, Newport Beach, CA (US); David Loeffelholz, Long Beach, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 276 days.

(21) Appl. No.: 15/488,724

(22) Filed: Apr. 17, 2017

(65) Prior Publication Data

US 2018/0297843 A1 Oct. 18, 2018

(51) Int. Cl.
*C01B 3/14* (2006.01)
*B01J 19/00* (2006.01)
*F28D 9/00* (2006.01)
*F28F 9/02* (2006.01)
*C01B 3/48* (2006.01)
*B01J 19/32* (2006.01)
*B01J 37/02* (2006.01)
*B01J 19/24* (2006.01)

(52) U.S. Cl.
CPC ......... *B01J 19/0013* (2013.01); *B01J 19/243* (2013.01); *B01J 19/32* (2013.01); *B01J 37/0215* (2013.01); *C01B 3/48* (2013.01); *B01J 2219/00092* (2013.01); *B01J 2219/00103* (2013.01); *B01J 2219/32286* (2013.01); *C01B 2203/0233* (2013.01); *C01B 2203/0283* (2013.01); *C01B 2203/0811* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,980,440 A | * | 9/1976 | Morse ..................... | B01J 8/062 422/202 |
| 4,083,695 A | * | 4/1978 | Haese ..................... | B01J 3/042 422/201 |
| 4,101,987 A | * | 7/1978 | Gagnon ................... | E04H 4/06 4/504 |
| 4,229,419 A | * | 10/1980 | Haese ..................... | B01J 8/062 422/202 |
| 4,265,301 A | * | 5/1981 | Anderson ................ | F28D 7/16 165/162 |
| 4,286,366 A | * | 9/1981 | Vinyard .................. | F28D 7/16 122/510 |

(Continued)

*Primary Examiner* — Kaity V Chandler
(74) *Attorney, Agent, or Firm* — Lorenz & Kopf, LLP (57) ABSTRACT

A cell structure is provided that is (i) capable of handling, on inner and outer surfaces, heat transfer requirements of heat exchangers and/or be a substrate for coatings for catalytic reactors, (ii) able to be easily combined and interconnected into a variety of shapes, and (iii) may be created in an additive manufacturing process. The provided cell structure may be replicated and interconnected with other cell structures to create lattice structures in a variety of shapes. Accordingly, the cell structure may be used to build a heat exchanger or catalytic reactor that has reduced weight compared to traditional architectures.

16 Claims, 7 Drawing Sheets

(56) References Cited

U.S. PATENT DOCUMENTS

| | | | |
|---|---|---|---|
| 4,592,888 A * | 6/1986 | Cornu | F28D 1/0213 165/163 |
| 6,419,009 B1 * | 7/2002 | Gregory | F28D 1/053 165/144 |
| 6,481,207 B2 | 11/2002 | Miura et al. | |
| 6,641,625 B1 | 11/2003 | Clawson et al. | |
| 6,835,482 B2 | 12/2004 | Kawamoto et al. | |
| 6,998,096 B2 | 2/2006 | Ishikawa | |
| 7,037,472 B2 | 5/2006 | Komiya et al. | |
| 7,628,963 B2 | 12/2009 | Woo et al. | |
| 7,799,449 B2 | 9/2010 | Park et al. | |
| 8,069,678 B1 * | 12/2011 | Bernert | F28F 9/0282 62/50.2 |
| 8,631,828 B1 * | 1/2014 | Ward | B01F 5/0268 137/561 A |
| 8,696,773 B2 | 4/2014 | Fuju et al. | |
| 8,702,823 B2 | 4/2014 | Kani et al. | |
| 9,350,037 B2 | 5/2016 | Steinwandel et al. | |
| 9,909,811 B1 * | 3/2018 | Hoffman | F28D 1/0213 |
| 10,128,518 B2 * | 11/2018 | Lo | H01M 8/0618 |
| 2002/0172630 A1 | 11/2002 | Ahmed et al. | |
| 2004/0126288 A1 | 7/2004 | Fuju et al. | |
| 2005/0056408 A1 * | 3/2005 | Gregory | F28D 1/053 165/151 |
| 2005/0211802 A1 * | 9/2005 | Newton | A01C 23/04 239/548 |
| 2007/0104983 A1 | 5/2007 | Wakita et al. | |
| 2007/0166580 A1 | 7/2007 | Kim et al. | |
| 2008/0090112 A1 | 4/2008 | Lee et al. | |
| 2009/0042071 A1 * | 2/2009 | Fischer | B01J 8/067 429/415 |
| 2010/0239925 A1 | 9/2010 | Ohkawara et al. | |
| 2011/0123880 A1 | 5/2011 | Mukai et al. | |
| 2011/0277972 A1 * | 11/2011 | Mudawar | C01B 3/0031 165/138 |
| 2012/0114537 A1 | 5/2012 | Son | |
| 2012/0231359 A1 | 9/2012 | Fuju et al. | |
| 2014/0014493 A1 | 1/2014 | Ryan | |
| 2015/0303502 A1 | 10/2015 | Fujioka et al. | |
| 2016/0202003 A1 | 7/2016 | Gerstler et al. | |
| 2016/0209124 A1 * | 7/2016 | Da Silvaa | C09K 5/063 |

* cited by examiner

CELL STRUCTURES FOR USE IN HEAT EXCHANGERS, AND METHODS OF PRODUCING THE SAME

TECHNICAL FIELD

The present disclosure generally relates to heat exchange structures and methods of producing the same, and more particularly relates to lightweight cell structures for use in variously shaped heat exchange and catalytic reactor applications, and methods of producing the same.

BACKGROUND

Mobile platforms, such as aircraft, generally employ heat exchangers having one of two design architectures. Plate-fin designs are often found in applications of low or moderate pressure, and tube bundle designs are often found in high-pressure applications. Both of these design architectures require headers that are heavy and take up extra space, and neither of these design architectures offer flexibility in shape. In addition to these technological challenges, the commonly used design architectures often have housings and transitional areas that do not contribute to heat transfer, add weight, and can be vulnerable to leakages, which is an efficiency challenge. Catalytic reactors, such as Catalytic converters, Catalytic Inert Gas generators, Steam Reformers, Autothermal Reformers and Combined Hydrocarbon/Ozone Converters (CHOC), share similar technological challenges.

Accordingly, architectural improvements that reduce weight, improve efficiency, and easily adapt a heat exchanger to a variety of shapes are desirable. It is further desirable to address these technological challenges at a fundamental building block level. It is desirable, therefore, to provide a cell structure (i) capable of handling heat transfer requirements, (ii) able to be easily combined into a variety of shapes, and (iii) from which a heat exchanger can be built that has reduced weight compared to design architectures with thick, heavy, high-pressure containment walls. Furthermore, other desirable features and characteristics of the present embodiment will become apparent from the subsequent detailed description and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a cell structure for use in a heat exchanger. The cell structure comprising: a hub, defined as a central chamber having an inner surface and an outer surface; and a number (n) of tubes, where n is three or more, each tube having a first end, a second end, an inner surface, and an outer surface; and wherein, the n tubes are configured such that (i) each first end comprises an opening integrally joined at the hub, (ii) each second end extends away from the hub, (iii) the inner surface of each tube and the inner surface of the hub form a smooth, continuous, structure inner surface, (iv) the outer surface of each tube and the outer surface of the hub form a smooth, continuous structure outer surface, and (v) there are no other openings into the hub or the n tubes.

Also provided is a lattice structure for use in a heat exchanger, the lattice structure comprising: a plurality of hubs, each defined as a central chamber having an inner surface and an outer surface; and a plurality of tubes, each tube having an inner surface and an outer surface; each hub of the plurality of hubs directly connected to at least three of the plurality of tubes, such that, for each of the at least three tubes connected to the hub, (i) the inner surface of each tube and the inner surface of the hub form a smooth, continuous, structure inner surface, (ii) the outer surface of each tube and the outer surface of the hub form a smooth, continuous structure outer surface, (iii) there are no other openings into the hub or the tubes, and (iv) for each hub, each tube of the at least three tubes connected thereto is oriented at a substantially 109 degree angle from each other tube of the at least three tubes; and wherein tubes and hubs are interconnected to define (i) a repeating shape, (ii) an inner flow path comprising structure inner surfaces, and (iii) an outer flow path comprising structure outer surfaces.

A hydrogen production system is provided. The hydrogen production system comprising: a vessel wall; a separate lattice structure defining each of the following chambers, a reformer reactor, a burner, a steam generator, a superheating heat exchanger, an air pre-heater, a fuel pre-heater, a water gas shift reactor, and a condensing heat exchanger; wherein a lattice structure comprises (a) a plurality of hubs, each defined as a central chamber having an inner surface and an outer surface, and (b) a plurality of tubes, each tube having an inner surface and an outer surface; wherein each hub of the plurality of hubs is directly connected to three of the plurality of tubes, such that, for each of the three tubes connected to the hub, (i) the inner surface of each tube and the inner surface of the hub form a smooth, continuous, structure inner surface, (ii) the outer surface of each tube and the outer surface of the hub form a smooth, continuous structure outer surface, (iii) there are no other openings into the hub or the tubes, and (iv) for each hub, each tube of the three tubes connected thereto is oriented at a substantially 109 degree angle from each other tube; and wherein tubes and hubs are interconnected to define (i) a inner flow path comprising structure inner surfaces, and (ii) an outer flow path comprising structure outer surfaces; and wherein the vessel wall substantially encloses the chambers.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

A novel cell structure for use in heat exchangers and catalytic reactors is introduced herein. The provided cell structure has a geometry that offers high strength and supports flow paths with favorable flow geometries. The provided cell structure maximizes an internal surface and an outer surface for heat exchange, and may be produced using an additive manufacturing technology. The provided cell structure is designed to be replicated into a plurality of cell structures that may be interconnected as appropriate for an application. By mechanically connecting a plurality of the cell structures, a three dimensional lattice may be formed; because of the disclosed design of the cell structure, the three-dimensional lattice not only has internal fluid flow paths (through the connected cell structures), but also has outer fluid flow paths across the outer surfaces of the cell structure. Applications for the described cell structure may include catalytic converters, steam reformers, autothermal reformers, heat exchangers, and many other uses.

Additive manufacturing is referenced herein. Addititve manufacturing, sometimes referred to as 3D printing, involves a process where successive layers of an object are formed. For metallic parts of an object, the feed material used in additive manufacturing may be a powdered metal or a metal feed supply, such as a wire. In the powdered feed material process, powdered metal can be applied to a base and melted in desired locations. The powdered feed material may be melted with an energy beam, such as a laser, electron beam, or other energy beam. The melted powder is solidified to form a layer of the desired product. More metal powder is provided and melted in desired locations to form the next layer, and the process proceeds. In a wire feed process, wire is melted and deposited in desired locations on a base or on previous layers to gradually build up a desired shape.

Figure 1:
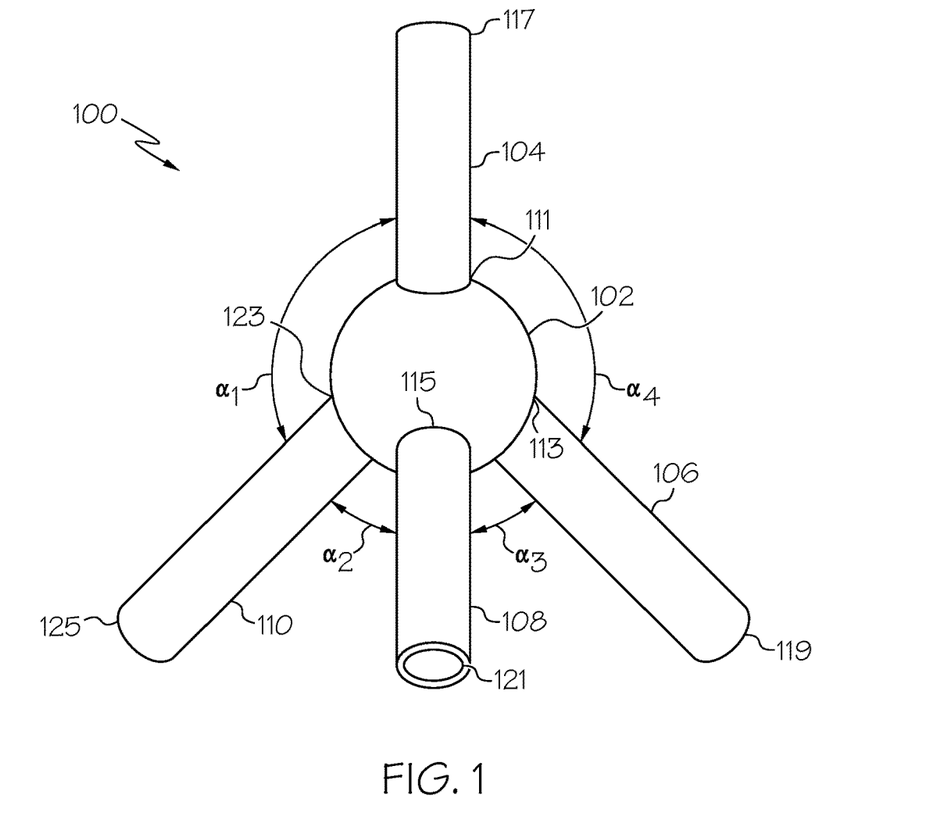
FIG. 1 is a diagram depicting one cell structure for use in a heat exchanger or catalytic reactor, in accordance with various embodiments.

Turning now to FIG. 1, a two dimensional rendering of a cell structure 100 for use in a heat exchange application is illustrated. A "tube," as used herein, is an enclosed passageway between two distinct locations (a first end and a second end), and a "hub," as used herein, is an enclosed volume or central chamber that is in direct fluid communication with a number (n) of mechanically connected tubes. In the depicted embodiment, n is four; tubes 104, 106, 108, and 110 are mechanically connected to hub 102. The n tubes comprise a first end (111, 113, 115, 123) and a second end (117, 119, 121, 125), and are mechanically connected to the hub 102 at the first end, such that a tube opening at the first end is a flow path into and/or out of the central chamber of the hub 102. For each of the n tubes, the second end extends away from the hub 102. As may be readily appreciated, in various embodiments of the cell structure 100, there are no other openings into the chamber of the hub 102 except for the openings of each of the n tubes.

An angle formed between a given tube and any of its neighbor tubes is substantially equal. When n is four, alpha is a 109 degree angle, therefore, each tube is oriented at substantially a 109 degree angle from each other tube (wherein substantially means plus or minus five percent). For example, in FIG. 1 the angle between tube 104 and tube 106 is alpha 4, the angle between tube 106 and tube 108 is alpha 3, the angle between tube 108 and tube 110 is alpha 2, and the angle between tube 110 and tube 104 is alpha 1. Although not depicted in FIG. 1, it is understood that an angle alpha 5 is between 110 and 106 and an angle alpha 6 is between 104 and 108. Accordingly, alpha 1=alpha 2=alpha 3=alpha 4=alpha 5=alpha 6). Although n is four in FIG. 1, and the resulting cell structure shape may be described as a diamond cubic, or a tetrahedral, other embodiments may employ other numbers of tubes, and the number of tubes changes the angles between the tubes and the resultant cell structure shape.

Figure 2:
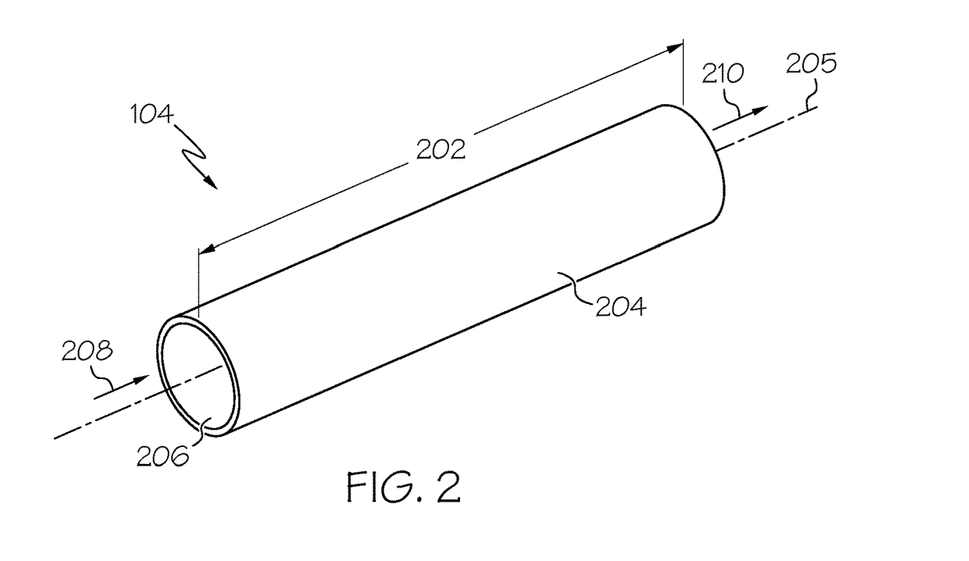
FIG. 2 and FIG. 3 are diagrams depicting a tube of the cell structure of FIG. 1, in accordance with various embodiments.
Figure 3:
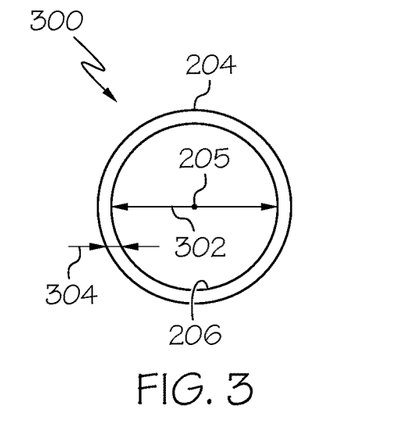

With reference to FIG. 2 and FIG. 3, each tube 104 (106, 108, and 110) is symmetrical around axis 205, has a length 202, an inner surface 206 and an outer surface 204. Fluid flow 208 entering at one end of a tube 104 exits as fluid flow 210 at an opposite end. The tube 104 has a cross section 300, described by a diameter 302, and a tube thickness 304. Although tube 104 is depicted as having a circular cross section 300, many other tube cross-sectional shapes are supported.

Figure 4:
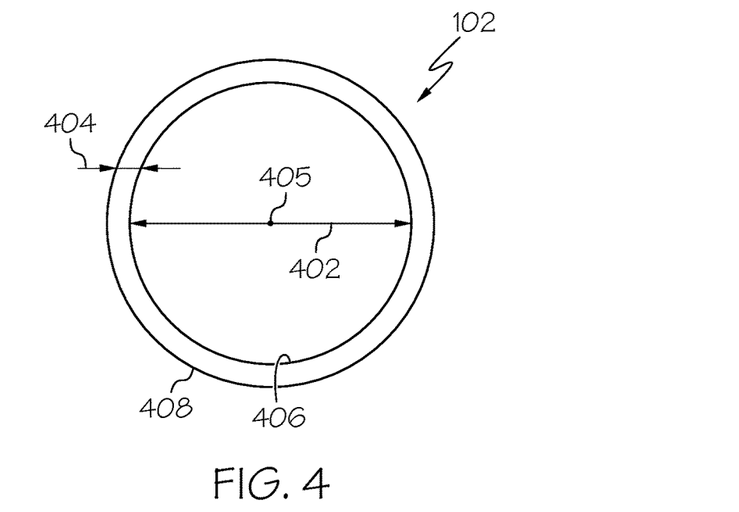
FIG. 4 is a diagram depicting a cross section of a spherical hub of the cell structure of FIG. 1, in accordance with various embodiments.
Figure 5:
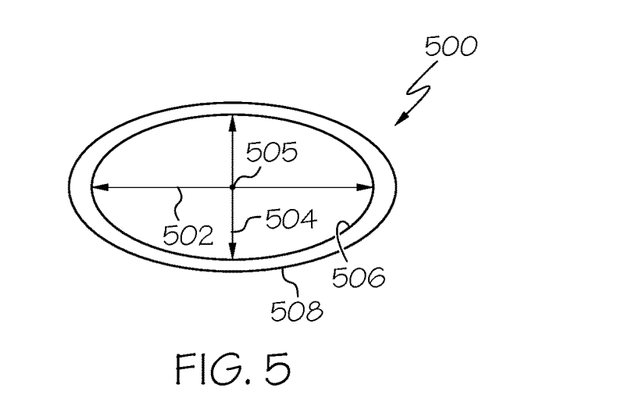
FIG. 5 is a diagram depicting a cross section of an elliptical hub of a cell structure, in accordance with various embodiments.

Turning now to FIG. 4, hub 102 is a central chamber having an inner surface 406 and an outer surface 408. Hub may have hub thickness 404, and may be measured around a central axis 405. In various embodiments, hub thickness 404 may be within five percent of the tube thickness 304. In FIG. 4, hub 102 is spherical, with a diameter 402; however, the hub 102 is not limited to having a spherical shape; in another embodiment, hub 500 has an oval shape (FIG. 5). Additionally, the cross section of each tube (104, 106, 108, 110) at the entrance/exit into the hub 102 (or hub 500) may vary slightly from a cross sectional area mid-length (i.e., approximately 202/2). As with a spherical hub 102, oval hub 500 has inner surface 506 and outer surface 508. The oval shape of oval hub 500 is defined as having major axis 502 and minor axis 504, intersecting centrally at 505.

As may be appreciated, generation of cell structure 100 can present a machining difficulty, which makes additive manufacturing a desirable approach. As may also be appreciated, the boundary between a hub 102 and a tube (104, 106, 108, 110) produced via additive manufacturing may be less distinctive than what is depicted in FIG. 1. With reference to FIG. 1, and in view of FIG. 7, when produced via an additive manufacturing process, the n tubes are mechanically connected, or integrally joined, with the hub 102, such that the inner surfaces of the n tubes and the inner surface of the hub 102 form a smooth, continuous "structure inner surface." Likewise, the outer surface of the n tubes and the outer surface of the hub 102 form a smooth, continuous "structure outer surface." The structure inner surface and structure outer surface may comprise different materials, as is suitable to an application. The structure inner surface and structure outer surface may each be impermeable.

Further, in accordance with various applications, either the structure inner surface or the structure outer surface may act a substrate for a washcoat and/or catalyst deposited on it, to enable the cell structure 100 to be used in catalytic reactor applications. Various catalysts may be deposited on or within a cell structure 100 by masking off undesired components of a cell structure and flowing a washcoat with the selected catalyst through the desired location. The catalyst may remain in a residual layer, and/or may be fixed by an anneal or other heat treatment. The catalyst deposition technique may be repeated to obtain the desired catalyst loading. Different catalysts may be sequentially deposited, or they may be simultaneously deposited if the masking, washcoating, and heat-treating processes allow.

Figure 6:
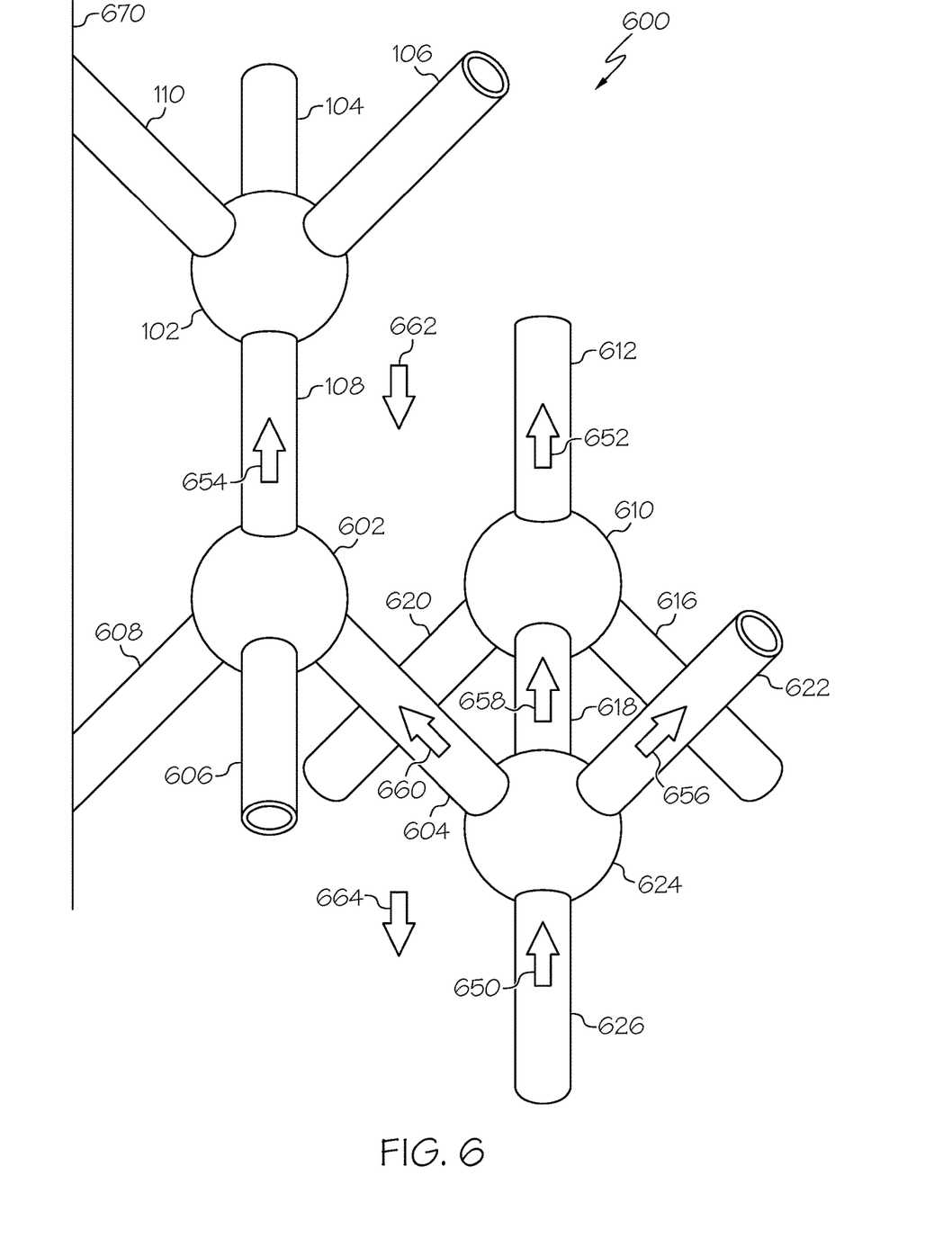
FIG. 6 is a diagram depicting multiple cell structures mechanically coupled together to form a lattice, in accordance with various embodiments.

The cell structure 100 may be one of a plurality of interconnected cell structures. In various embodiments, cell structures 100 may be interconnected in one (or more) repeating patterns or no recognizable repeating pattern. By joining a plurality of cell structures 100, a three-dimensional (3D) lattice structure (also referred to herein as simply, "lattice") may be created to fill a space or take a shape. A "lattice," as used herein, is a three-dimensional arrangement of components within a space that forms a continuous connection between any two components within the lattice, where the components do not fill the entire space. With reference to FIG. 6, a 3D lattice 600 is depicted in two dimensions. The lattice 600 is formed by interconnecting the diamond shaped cell structures 100 in a repeating pattern as follows. The cell structures 100 making up the lattice 600 are viewed as a plurality of tubes 104, 106, 108, 110, 604, 606, 608, 612, 616, 618, 620, 622, 626, and a plurality of hubs 102, 602, 610, and 624. Each hub is directly connected to at least three different tubes. Notably, when tubes and hubs are connected to form the lattice 600, the "first end" and "second end" of a tube, described in connection with FIG. 1, loses its significance because a previously defined "second end" of a tube is the "first end" at another hub. For example, hub 602 is directly connected to tubes 108, 604, 606, and 608; and tube 604 is also connected to hub 624.

Accordingly, the lattice 600 may be described as a plurality of tubes and hubs, wherein each hub of the plurality of hubs is directly connected to at least three of the plurality of tubes, such that, for each of the at least three tubes connected to the hub, (i) the inner surface of each tube and the inner surface of the hub form a smooth, continuous, structure inner surface, (ii) the outer surface of each tube and the outer surface of the hub form a smooth, continuous structure outer surface, (iii) there are no other openings into the hub or the tubes, and (iv) for each hub, each tube of the at least three tubes connected thereto is oriented at substantially a 109 degree angle from each other tube of the at least three tubes.

Figure 8:
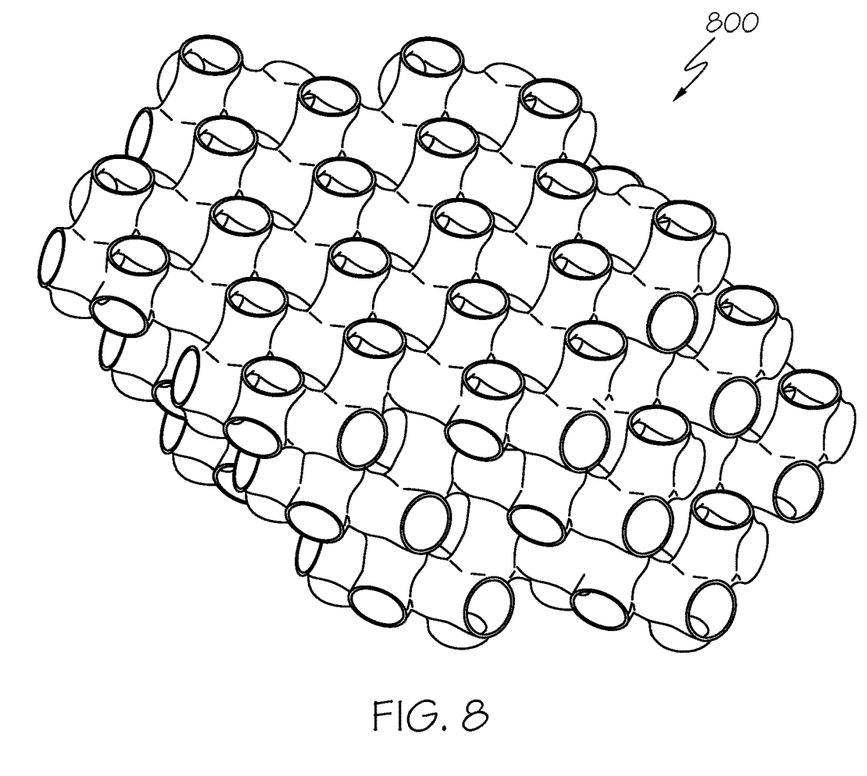
Figure 12:
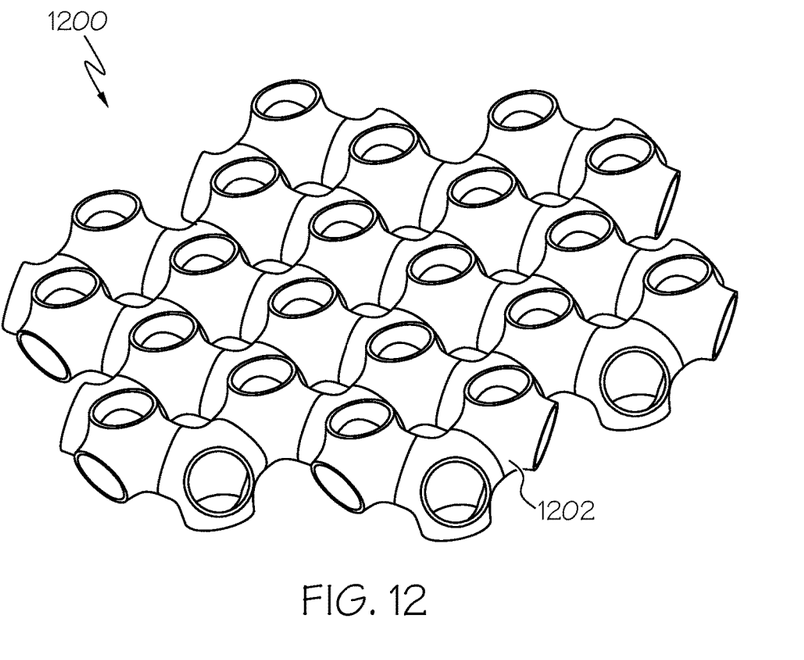
FIG. 12 is a simplified three dimensional illustration of a layer of integrated cell structures.

When viewing the lattice 600 as a plurality of interconnected cell structures, the importance of utilizing an additive manufacturing process is more apparent. When produced via an additive manufacturing process, for all of the cell structures of the plurality forming the lattice 600, the inner surfaces of the tubes and the inner surfaces of the hubs (i.e., the "structure inner surfaces") form a smooth, continuous "lattice structure inner surface." Likewise, the outer surfaces of the tubes and the outer surfaces of the hubs (i.e., the structure outer surfaces) form a smooth, continuous "lattice structure outer surface." Therefore, lattice 600 may further be described as having interconnected tubes and hubs that define (i) a repeating shape, (ii) an inner flow path (650, 652, 654, 656, 658) comprising lattice structure inner surfaces, and (iii) an outer flow path (662, 664) comprising lattice structure outer surfaces. FIG. 8 (lattice 800) and FIG. 12 (lattice 1200) depict exemplary embodiments of integrally joined cell structures (700, 1202) resulting from an additive manufacturing process.

With regard to the flow paths, it is observable that fluid can flow in a selected direction through the entire lattice 600 (800, 1200), when viewed at a macro level of movement. As is readily appreciated in view of FIG. 6, fluid flow through any lattice will have a macro movement direction and various micro movement directions within the macro movement direction. As used herein, "fluid communication" means a fluid is capable of flowing from a source to a destination, where there may or may not be an intermediate object through which the fluid flows. Looking at micro movement directions, the fluid flow can encounter bends and turns at the hubs that amount to agitation of the fluid flow. For example, fluid flowing vertically up or down (at a macro movement level) in the embodiment illustrated in FIG. 6 could flow in essentially straight lines (at a macro movement level), with some agitation (or micro movement) within the hubs 102, 602, 610, and 624.

Once the cell structure 100 is repeated in a pattern to create a 3D lattice of almost unlimited shapes, the 3D lattice 600 may be connected to a vessel wall 670 in a plurality of discrete locations, such that the 3D lattice 600 supports the vessel wall 670. The connections at a plurality of discrete locations provides support to the vessel wall 670, making it capable of withstanding greater pressures and stresses than an unsupported vessel wall of the same thickness. In addition, the support provided by the connections at a plurality of discrete locations allows the vessel wall 670 to be thinner for a set pressure rating than a conventional vessel wall, so the weight of the vessel wall, and entire vessel, can be reduced. As may be apparent, in various embodiments, the vessel wall 670 may serve as a wall partition, or may serve as an enclosure for the lattice 600. In various embodiments, the vessel wall 670 may substantially enclose, for example, in a radial direction, the shape created by a given lattice 600. Further, the lattice 600 may tie vessel wall 670 to a wall partition or another vessel wall, for example, on an opposite side (not shown), to further increase the stiffness and strength of the vessel wall 670, or to segregate fluid flow in accordance with an application. The use of vessel walls and wall partitions is described in more detail in connection with FIG. 10.

Figure 7:
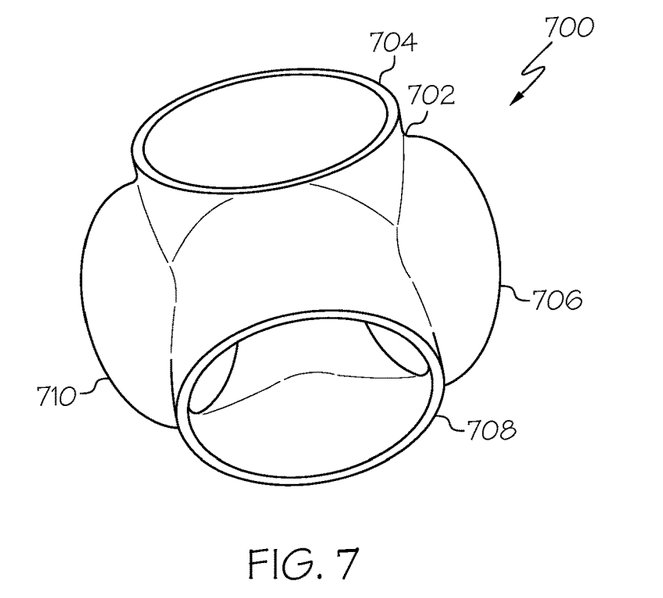
FIG. 7 and FIG. 8 are three dimensional illustrations depicting another embodiment of a cell structure and a plurality of the embodiment of cell structures mechanically coupled together to form a three dimensional lattice system, in accordance with various embodiments.

FIGS. 1-6 are two-dimensional images useful for identifying features and relationships within the cell structure 100. However, as mentioned, when the cell structure 100 is generated with an additive manufacturing process, the resultant cell structure may look more like cell structure 700, shown in FIG. 7. In FIG. 7, the hub 702 and the tubes 704, 706, 708, and 710 are shown. Cell structures 700 may be integrally joined, as described above, to form a 3D lattice, such as lattice 800 of FIG. 8, or lattice 1200 of FIG. 12. The lattice 800 and the supported fluid flow, internally and externally (outer flow paths), meet all of the same characteristics described in connection with FIG. 6.

Figure 9:
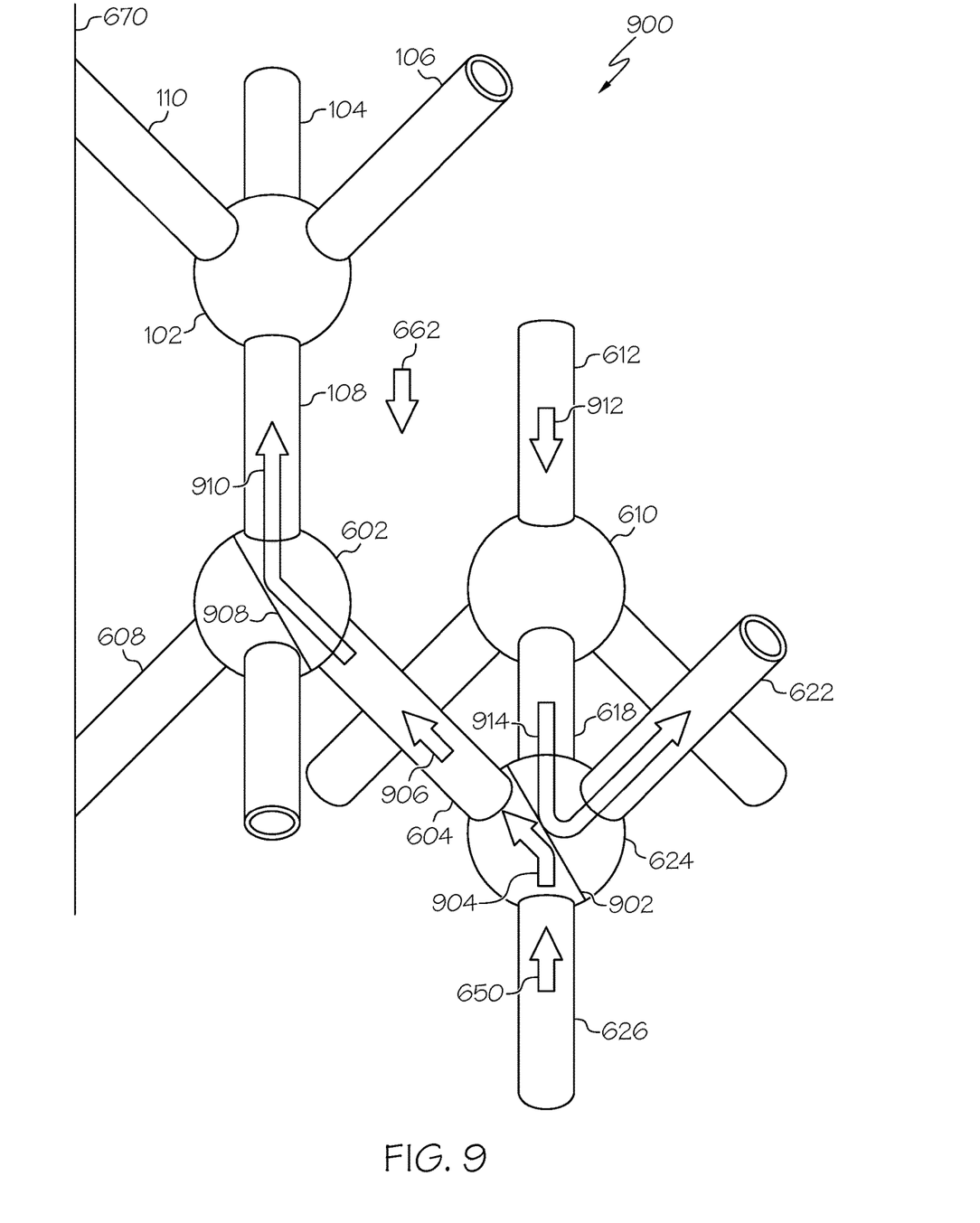
FIG. 9 is the diagram of FIG. 6, with internal partitions added to hubs.

Adding another level of distinction and functionality, the central chamber of each hub of the plurality of hubs in a lattice 600 may be partitioned to support more than one flow path through the cell structure. Turning to FIG. 9, the lattice 600 of FIG. 6 is shown, with added internal partitions in hub 602 and hub 624. A partition extends across the central chamber of the hub in which it resides; it is seamlessly joined along its entire perimeter to the structure inner surface, dividing the central chamber into a first sub-chamber and a second sub-chamber. The partition prevents fluid communication between the first sub-chamber and second sub-chamber. As shown in FIG. 9, partition 902 divides hub 624 into a first sub-chamber and a second sub-chamber, and partition 908 divides hub 602 into a first sub-chamber and a second sub-chamber. Partitions increase the number of flow paths through a lattice 600, and allow fluid to flow in opposing directions on each side of the partition. For each partition in a hub of a cell structure, a first tube, first sub-chamber, and second tube comprise a first flow path; and a third tube, second sub-chamber, and fourth tube comprise a second flow path; and the first flow path and second flow path are in fluid isolation from each other.

With reference to FIG. 9, partition 902 and partition 908 impart the following characteristics. Fluid flow 650 in tube 626 enters hub 624 and is deflected by partition 902 (shown as fluid flow 904), then flowing through tube 604 (as fluid flow 906), is deflected by partition 908 and continues upward as fluid flow 910. In another fluid flow direction, fluid flow 912 enters hub 624, is deflected by partition 902 (as fluid flow 914), and flows into tube 622. Tube 626, the left side of hub 624, and tube 604 define a first flow path, and tube 618, the right side of hub 624, and tube 622 define a second flow path. Notably, fluid flow 904 and fluid flow 914 are in opposite directions and are completely fluidly isolated from each other. Although fluid flow 904 and fluid flow 914 are in opposite directions, they may also be in the same direction.

As mentioned above, the vessel wall 670 may at least partially enclose a lattice 600, creating therefrom a vessel. A vessel for use in a given heat exchange or catalytic reactor application can be created by enclosing, at least partially, the described 3D lattice with a vessel wall. A vessel so created delivers a reduced overall weight over conventional solutions to the same heat exchange or catalytic reactor application. In addition, because at least one fluid flow path is supported inside the 3D lattice of the vessel (the inner flow path), and at least one fluid flow path is supported outside the 3D lattice of the vessel (the outer flow path), one vessel can be used for at least two heat exchange or catalytic reactions, reducing the number of vessels and the amount of space (or volume) required for a given application.

Figure 10:
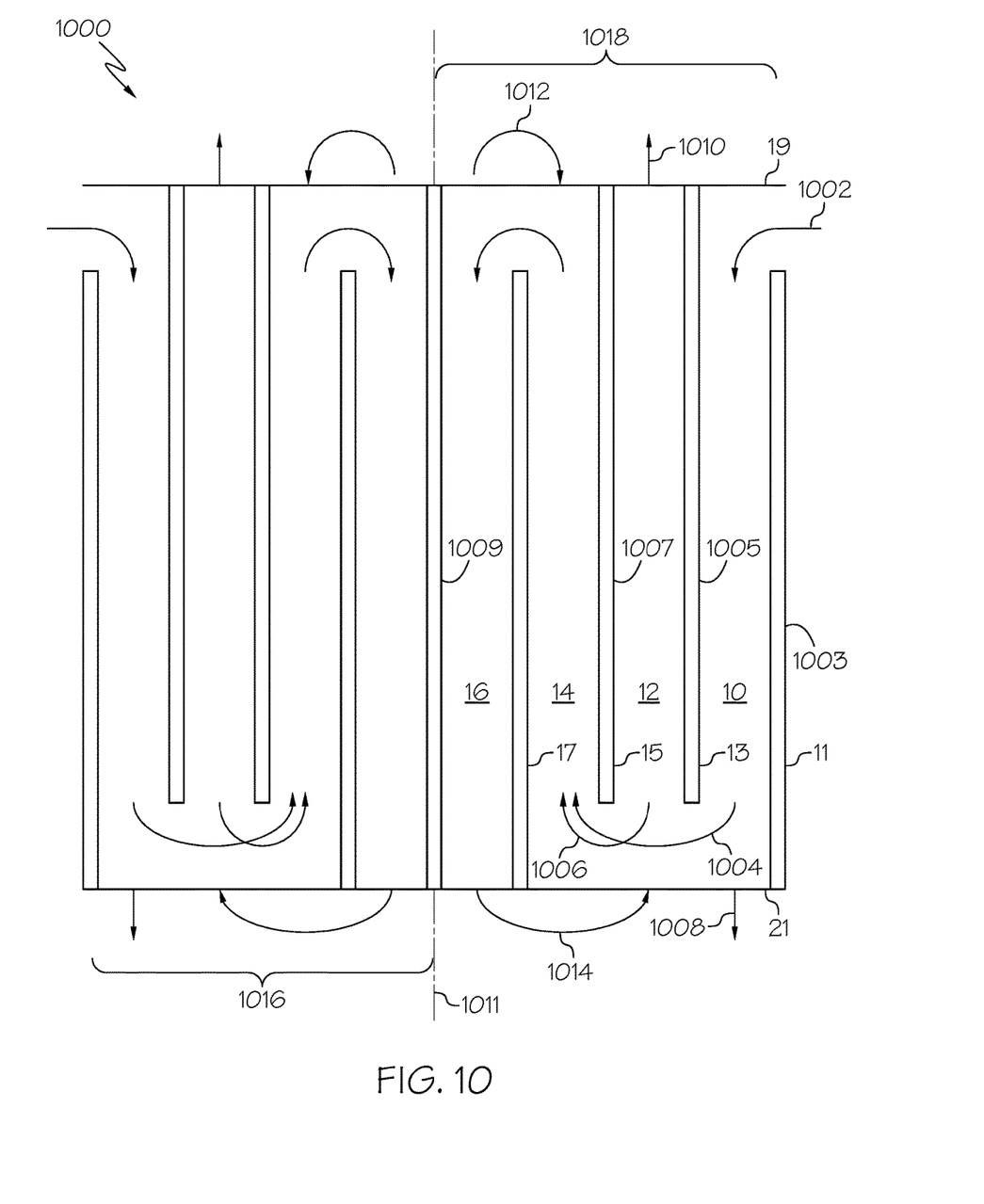
FIG. 10 is a simplified two dimensional cross section of a plurality of lattices having wall partitions and vessel walls, to illustrate the concept of nested lattice layers, in accordance with the embodiment.

The above concepts are illustrated in FIG. 10, with continuing reference to FIG. 9. In various applications, a vessel may comprise multiple wall partitions 13, 15, and 17, which create a plurality of separate vessel chambers. The vessel chambers are each filled with a respective lattice (10, 12, 14, and 16). For each lattice 10, 12, 14, and 16, there is an inner flow path and an outer flow path. A first header 19 and a second header 21 are configured to separately direct fluid for each lattice (10, 12, 14, and 16) from the inner and outer flow paths without mixing the two, so separate fluid streams can concurrently pass through each lattice and remain separated within the respective inner and outer flow paths. (Note: flow paths within the first and second headers 19, 21 are not illustrated). The lattices (10, 12, 14, and 16) provide a significant surface area from the plurality of tubes and hubs, therefore, forming the cell structure 100 with a material with high thermal conductivity enables a high rate of heat exchange between the inner and outer flow paths for an individual lattice (10, 12, 14, and 16).

In FIG. 10, fluid flow 1002 enters lattice 10, partially enclosed by vessel wall 11 and wall partition 13. Fluid flow 1002 is understood to be in an internal flow path of lattice 10. Fluid flow 1004 exiting lattice 10 is still in an internal fluid flow path, and merges with fluid flow 1006, exiting an internal flow path of lattice 12. Fluid flow 1008 may represent fluid flow in an outer flow path, as does fluid flow 1014, 1010, and 1012. In an embodiment, the entire pattern 1018 of lattices (10, 12, 14, and 16) and wall partitions (13, 15, and 17) and the vessel wall 11 may be folded around a dividing wall 1009, and replicated as pattern 1016.

Figure 11:
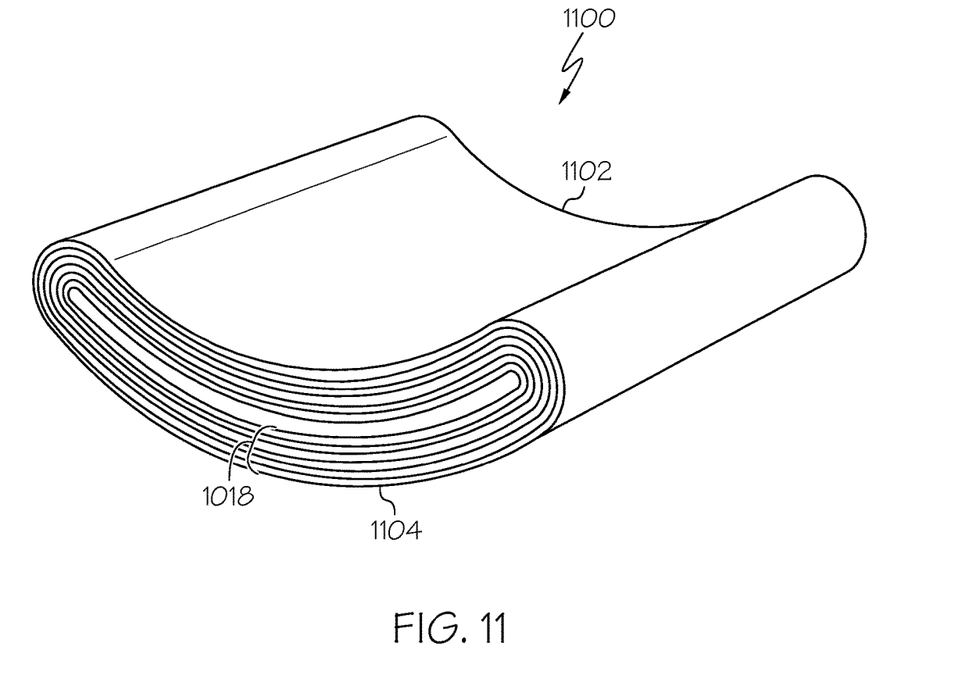
FIG. 11 is a three dimensional illustration depicting nested lattice layers, folded, and formed in an application specific shape, such as for a heat exchange system, in accordance with various embodiments.

Further, as the individual lattices may be generated to take any shape, so too can a plurality of lattices that are folded and enclosed, as a vessel, within a singular outer vessel wall. FIG. 11 depicts a C-shaped vessel 1100 that is concave on surface 1102 and convex on surface 1104. In the depicted embodiment, the pattern 1018 is shown inside vessel 1100 and is shown folded within vessel 1100. It is to be understood that the application drives the choice of shape and the use of the cell structures 100 within that shape.

Generating a C-shaped vessel, such as vessel 1100, or one of various other shapes, can present a machining challenge. To overcome this difficulty, various embodiments employ additive manufacturing. Additive manufacturing allows for the production of complex shapes, including the lattice 900 positioned within a complex application, because the item is gradually built up in layers. This allows for complex internal structures that are not readily accessible for more traditional machining.

With reference again to FIG. 10 and FIG. 11, an example application is provided. A desired vessel 1100 may be a hydrogen production system, having the following separate chambers: a reformer reactor, a burner, a superheating heat exchanger, a steam generator, an air pre-heater, a fuel pre-heater, a water gas shift reactor, and a condensing heat exchanger. The entire application may include an outer vessel wall referred to herein as an outer shell. Headers on the various separate vessel chambers may provide conduits to direct fluid flow between the separate vessel chambers. A separate lattice structure may be used for each of the chambers. In addition, wall partitions may further direct the macro movement of fluid flow within the application.

Thus, a cell structure 100 for use in heat exchange applications and catalytic reactor applications has been described. When generated in an additive manufacturing process, the cell structure 100 may be replicated in repeating or non-repeating patterns to create a lattice 900, and the lattice may be partitioned with wall partitions (13, 15, and 17) or vessel walls 11. The partitioned lattice may further be folded and enclosed within a vessel wall to create a vessel suitable for a variety of heat exchange or catalytic reactor applications. As is readily appreciated, the above examples are non-limiting, and many other embodiments may meet the functionality described herein while not exceeding the scope of the disclosure.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one embodiment has been presented in the foregoing detailed description of the invention, it should be appreciated that a vast number of variations exist. It should also be appreciated that the embodiment or embodiments are only examples, and are not intended to limit the scope, applicability, or configuration of the invention in any way. Rather, the foregoing detailed description will provide those skilled in the art with a convenient road map for implementing an embodiment of the invention, it being understood that various changes may be made in the function and arrangement of elements described without departing from the scope as set forth in the appended claims and their legal equivalents.

What is claimed is:

1. A cell structure for use in a heat exchanger, the cell structure comprising:
    a hub, defined as a central chamber having an inner surface and an outer surface; and
    a number (n) of tubes, where n is three or more, each tube having a first end, a second end, an inner surface, and an outer surface; and
    wherein, the n tubes are configured such that (i) each first end comprises an opening integrally joined at the hub, (ii) each second end extends away from the hub, (iii) the inner surface of each tube and the inner surface of the hub form a smooth, continuous, structure inner surface, (iv) the outer surface of each tube and the outer surface of the hub form a smooth, continuous structure outer surface, and (v) there are no other openings into the hub or the n tubes; and an impermeable partition extending across the central chamber of the hub, integrally joined along its perimeter to the central chamber inner surface, dividing the central chamber into a first sub-chamber and a second sub-chamber, the partition preventing fluid communication between the first sub-chamber and the second sub-chamber; and wherein a first tube, the first sub-chamber, and a second tube comprise a first flow-path; and a third tube, the second sub-chamber, and a fourth tube comprise a second flow-path; and wherein the first flow-path and the second flow-path are in fluid isolation from each other.

2. The cell structure of claim 1, wherein n is four.

3. The cell structure of claim 2, wherein each tube of the four tubes integrally joined at the hub forms a substantially 109 degree angle from every other of the tubes integrally joined at the hub.

4. The cell structure of claim 3, wherein substantially is plus or minus five percent.

5. The cell structure of claim 4, wherein:
    the structure inner surface is impermeable; and
    the structure outer surface is impermeable.

6. The cell structure of claim 5, wherein a material comprising the structure inner surface is different from a material comprising the structure outer surface.

7. The cell structure of claim 6, wherein a second end of a tube is is integrally joined to a vessel wall.

8. The cell structure of claim 7, wherein:
    each of the n tubes has a same cross sectional area as each other, defined as a tube cross section;
    the hub has a cross sectional area, defined as a hub cross section; and
    the hub cross section is larger than the tube cross section.

9. The cell structure of claim 8, wherein:
    the n tubes have a tube thickness;
    the hub has a hub thickness; and
    the tube thickness and hub thickness are not equal.

10. A lattice structure for use in a heat exchanger, the lattice structure comprising:
    a plurality of hubs, each defined as a central chamber having an inner surface and an outer surface; and
    a plurality of tubes, each tube having an inner surface and an outer surface;
    each hub of the plurality of hubs directly connected to at least three of the plurality of tubes, such that, for each of the at least three tubes connected to the hub, (i) the inner surface of each tube and the inner surface of the hub form a smooth, continuous, structure inner surface, (ii) the outer surface of each tube and the outer surface of the hub form a smooth, continuous structure outer surface, (iii) there are no other openings into the hub or the tubes, and (iv) for each hub, each tube of the at least three tubes connected thereto is oriented at a substantially 109 degree angle from each other tube of the at least three tubes; and
    wherein tubes and hubs are interconnected to define (i) a repeating shape, (ii) an inner flow path comprising structure inner surfaces, and (iii) an outer flow path comprising structure; and a vessel wall, to which some of the plurality of tubes are integrally joined.

11. The lattice structure of claim 10, wherein:
    the lattice structure defines a volume; and
    the volume is substantially enclosed in a radial direction by the vessel wall.

12. The lattice structure of claim 11, wherein:
    the volume is bisected by a vessel wall that prevents fluid communication between a first section of the volume and a second section of the volume.

13. The lattice structure of claim 12, wherein:
    the structure inner surfaces are non-permeable; and
    the structure outer surfaces are non-permeable.

14. The lattice structure of claim 13, wherein a material comprising the structure inner surfaces is different from a material comprising the structure outer surfaces.

15. The lattice structure of claim 14, further comprising:
    a partition extending across a central chamber of at least one hub, seamlessly joined along its perimeter to the structure inner surface, dividing the central chamber into a first sub-chamber and a second sub-chamber, the partition preventing fluid communication between the first sub-chamber and second sub-chamber.

16. The lattice structure of claim 15, wherein at least one tube is is mechanically coupled to the vessel wall.

\* \* \* \* \*